US009053620B2

(12) United States Patent
Clossen-Von Lanken Schulz

(10) Patent No.: US 9,053,620 B2
(45) Date of Patent: Jun. 9, 2015

(54) SCATTERED-LIGHT FIRE DETECTOR WITH A DEVICE FOR SUPPRESSING AN ACOUSTIC WARNING IN THE EVENT OF A LOW BATTERY VOLTAGE

(75) Inventor: Michael Clossen-Von Lanken Schulz, Issum (DE)

(73) Assignee: Siemens Aktiengesellschaft, Munich (DE)

( * ) Notice: Subject to any disclaimer, the term of this patent is extended or adjusted under 35 U.S.C. 154(b) by 216 days.

(21) Appl. No.: 13/218,554

(22) Filed: Aug. 26, 2011

(65) Prior Publication Data

US 2012/0050051 A1 Mar. 1, 2012

(30) Foreign Application Priority Data

Aug. 26, 2010 (DE) ........................ 10 2010 039 835

(51) Int. Cl.

| | |
|---|---|
| ***G08B 17/00*** | (2006.01) |
| ***G08B 21/00*** | (2006.01) |
| ***G08B 13/18*** | (2006.01) |
| ***G01J 1/44*** | (2006.01) |
| ***G08B 17/107*** | (2006.01) |

(52) U.S. Cl.

CPC .................................... *G08B 17/107* (2013.01)

(58) Field of Classification Search

USPC .......................................................... 340/628

See application file for complete search history.

(56) References Cited

U.S. PATENT DOCUMENTS

| | | | | |
|---|---|---|---|---|
| 4,186,390 | A * | 1/1980 | Enemark | 340/630 |
| 4,287,517 | A * | 9/1981 | Nagel | 340/636.15 |
| 4,300,133 | A | 11/1981 | Solomon | |
| 4,364,030 | A * | 12/1982 | Rossin | 340/567 |
| 4,857,895 | A | 8/1989 | Kaprelian | |
| 5,966,078 | A * | 10/1999 | Tanguay | 340/636.1 |
| 2008/0246623 | A1 | 10/2008 | Nagashima | |
| 2008/0258925 | A1 | 10/2008 | Siber et al. | |
| 2009/0256714 | A1* | 10/2009 | Loepfe et al. | 340/628 |

FOREIGN PATENT DOCUMENTS

| | | | |
|---|---|---|---|
| CN | 1882968 | A | 12/2006 |
| CN | 1902669 | A | 1/2007 |
| DE | 10 2007 039 401 | A1 | 2/2009 |
| EP | 1515290 | A1 | 3/2005 |

* cited by examiner

*Primary Examiner* — Jennifer Mehmood

*Assistant Examiner* — John Mortell

(74) *Attorney, Agent, or Firm* — Laurence A. Greenberg; Werner H. Stemer; Ralph E. Locher

(57) ABSTRACT

A fire detector has a detection unit working on the optical scattered-light principle, as well as an electronic evaluation unit. An acoustic and/or optical warning device outputs an acoustic and/or optical alarm when a fire is detected. The fire detector has an energy storage device, in particular a battery, for the autarkic supply of electrical power to the fire detector as well as a voltage measuring unit for measuring a battery voltage present at the energy storage device. A warning device outputs an acoustic warning if the battery voltage falls below a first voltage threshold. The fire detector also has a sensor sensitive to ambient light and a device for suppressing the output of the acoustic warning if the ambient light falls below a predefinable brightness threshold. The detection unit is an open scattered-light detection unit with a detection space outside the fire detector and the sensor sensitive to ambient light is at the same time an optical receiver of the scattered-light detection unit.

10 Claims, 1 Drawing Sheet

SCATTERED-LIGHT FIRE DETECTOR WITH A DEVICE FOR SUPPRESSING AN ACOUSTIC WARNING IN THE EVENT OF A LOW BATTERY VOLTAGE

CROSS-REFERENCE TO RELATED APPLICATION

This application claims the priority, under 35 U.S.C. §119, of German patent application DE 10 2010 039 835.7, filed Aug. 26, 2010; the prior application is herewith incorporated by reference in its entirety.

BACKGROUND OF THE INVENTION

Field of the Invention

The invention relates to a fire detector having a detection unit working on the optical scattered-light principle, as well as an electronic evaluation unit. It further comprises an acoustic and/or optical warning device for outputting an alarm when a fire is detected. Furthermore the fire detector comprises an energy storage device, in particular a battery, for the autarkic supply of electrical power to the fire detector as well as a voltage measuring unit for measuring a battery voltage present at the energy storage device. It has warning means for outputting an acoustic warning if the battery voltage falls below a first voltage threshold. Furthermore the fire detector comprises a sensor sensitive to ambient light as well as means for suppressing the output of the acoustic warning if the ambient light falls below a predefinable brightness threshold. Such automatic fire detectors can identify fires or their origin on the basis of physical properties of the fire and trigger an alarm. Thus the danger of a fire spreading can be significantly reduced.

The fire detectors in question are typically designed as point detectors and in particular are set up for standalone operation. To supply electrical power to the fire detector they in particular have a replaceable battery. It is also known for the fire detectors to output an acoustic warning signal when the battery voltage falls below a predefined lower voltage value, for example 7.5V when using a 9V block. The user of such a fire detector is thereby reminded to replace the soon-to-be-empty battery. Typically the acoustic reminder takes the form of short beeps of less than 1 second at given time intervals. The further the battery voltage falls below the lower voltage value, the shorter these intervals can be, for example 60-minute to 1-minute intervals.

A type TG500A smoke alarm with an optical measurement chamber shielded against ambient light is known from the product datasheet from the company Hager. It is set up to output an acoustic signal to replace the battery, which is suppressed when it is dark, in order not to disturb people's sleep.

SUMMARY OF THE INVENTION

It is accordingly an object of the invention to provide a fire detector which overcomes the above-mentioned disadvantages of the heretofore-known devices and methods of this general type and which provides for fire detector that suppresses an acoustic warning in the event of a low battery voltage.

With the foregoing and other objects in view there is provided, in accordance with the invention, a fire detector, comprising:

an open scattered light detection unit operational on an optical scattered-light principle within a detection space outside of a fire detector housing, said detection unit including an optical receiver sensitive to scattered light within said detection space;

an electronic evaluation unit connected to said detection unit and a warning device for outputting an acoustic and/or optical alarm when a fire is detected;

an energy storage device for an autarkic supply of electrical power to the fire detector;

a voltage measuring unit for measuring a battery voltage present at said energy storage device and a warning device for outputting an acoustic warning if the battery voltage falls below a given voltage threshold;

said optical receiver of said open scattered light detection unit also forming an ambient light sensor sensitive to ambient light; and a device for suppressing the output of the acoustic warning if a signal received from said ambient light sensor indicates that the ambient light lies below a predefined brightness threshold.

In other words, the fire detector according to the invention is distinguished in that it has an open scattered-light detection unit with a detection space situated outside the fire detector. The sensor sensitive to ambient light is at the same time an optical receiver of the scattered-light detection unit. As a result both scattered light from the smoke particles to be detected and the ambient brightness can be advantageously detected with a single component.

The sensor sensitive to ambient light is, for example, a light-sensitive resistor, a phototransistor or a photodiode, in particular a PIN photodiode. The brightness threshold can be set by means of a potentiometer. It typically corresponds to a brightness threshold appropriate for darkened rooms or a figure for the illuminance of less than 10 lx, preferably of less than 5 lx. The detection signal then output by the sensor is preferably filtered with a low-pass filter, for example with a time constant of several seconds, for example of 5, 10 or 30 seconds, in order if necessary to filter out interference signals present in the detection signal.

According to one embodiment the acoustic warning can be output by the acoustic warning device provided for outputting the acoustic alarm.

Alternatively or additionally an optical warning can be output by the optical warning device provided for outputting the optical alarm. The output is preferably effected by means of one or more LEDs, for example in the manner of a stroboscope.

According to a further embodiment the fire detector has a sensor for determining the presence or absence of people in the vicinity of the fire detector. The suppression means are additionally set up such that the output in particular of the acoustic warning is suppressed when the absence of people is detected. This means that the warning or instruction to replace the soon-to-be-empty battery is not given until a person is located in the vicinity of the fire detector. This advantageously reduces the power consumption.

The sensor for determining the presence or absence of people is preferably a motion detector known per se. Such a motion detector can work on the Doppler (radar) principle. Alternatively it may be an ultrasound motion detector or a PIR motion detector sensitive to body heat, i.e. to infrared light. Furthermore a sensor of this type can be set up such that a binary detection of people, in other words whether or not a person is present, e.g. in a region of up to 5 m around the fire detector, is effected. To this end the sensor can also have a potentiometer for setting the sensitivity for the detection of people or moving objects. Preferably such a sensor is not supplied with electrical power until the battery voltage detected falls below the first voltage threshold, for example via a switch which can be triggered by the evaluation unit.

Alternatively or additionally the fire detector has means for detecting fluctuations in a detection signal output by the optical receiver of the scattered-light detection unit. The suppression means are additionally set up such that the warning is suppressed if no, in particular no significant fluctuations are detectable in the detection signal. The special advantage of this embodiment is that no separate sensor for determining the presence or absence of people, in particular no motion detector, is necessary.

"Fluctuations" means temporal changes in the detection signal in the frequency range of a few hertz, in particular in the range of 1 to 10 Hz. Such fluctuations arise as a result of partial temporary variations in brightness, caused e.g. by people passing by in the vicinity of the fire detector, for example in a region of up to 5 m around the fire detector. Detected fluctuations are thus an indication that something is "happening" in the vicinity of the fire detector. The probability that these fluctuations are caused by a person, for example an occupant, can in this case be regarded as comparatively high. These fluctuations can be filtered by means of a filter, for example by means of a low-pass. The filter frequency is preferably in the range of 1 to 10 Hz. The filtered value can then be compared to a predefinable fluctuation threshold. If the filtered value then exceeds this fluctuation threshold, the warning is output at least for a predefinable time, for example 3 seconds, and/or until once again no fluctuations can be detected in the detection signal.

The warning device can also be set up such that they (again) cancel the suppression of the output of the warning if the battery voltage detected by the voltage measuring unit falls below a second voltage threshold which is lower than the first voltage threshold. This can e.g. be set such that power can still be supplied to the fire detector for at least 7 days.

According to another embodiment the warning can be output in the form of periodic short warning pulses. Finally at least a part of the voltage measuring unit, the warning means and/or the blocking means are implemented by the electronic evaluation unit. The latter can be an analog and/or digital electronic circuit which has e.g. A/D converters, amplifiers, comparators, operational amplifiers, logic gates, etc. Preferably the evaluation unit is a processor-aided processing unit, in particular a microcontroller, which is usually present "in any case" for the overall control of the fire detector. The suppression means and warning means of the fire detector are preferably emulated by program steps executed by the microcontroller, if necessary also using electronically stored values e.g. for the voltage thresholds and/or for the brightness threshold.

Other features which are considered as characteristic for the invention are set forth in the appended claims.

Although the invention is illustrated and described herein as embodied in a scattered-light fire detector with means for suppressing an acoustic warning in the event of a low battery voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
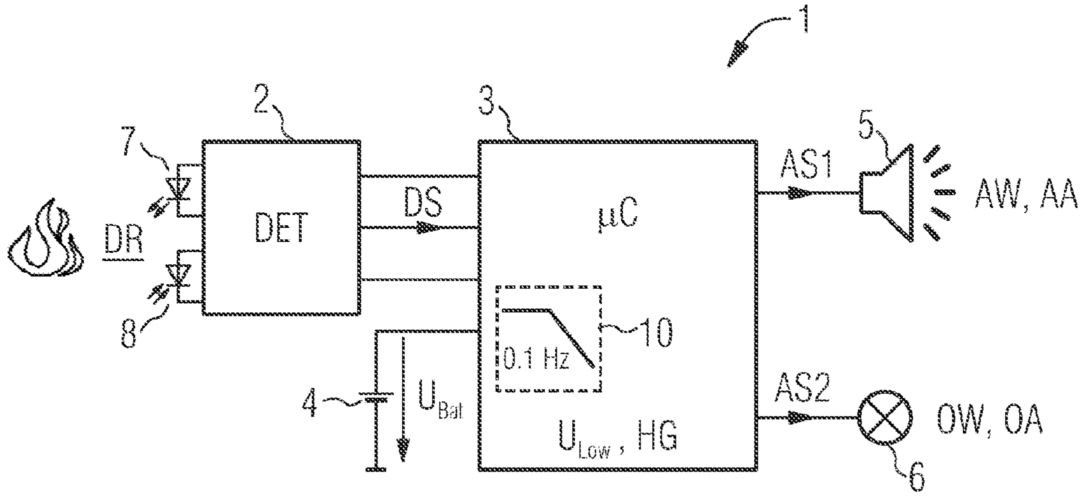
FIG. 1 is a block diagram of an exemplary embodiment of a fire detector according to the invention.

Referring now to the figures of the drawing in detail and first, particularly, to FIG. 1 thereof, there is shown an exemplary fire detector 1 in accordance with the invention. In the left-hand part of FIG. 1 is shown an open scattered-light detection unit 2 with a detection space DR situated outside the fire detector 1, i.e., outside a housing of the fire detector 1. The reference character 7 designates an LED as a lamp for irradiating the smoke particles to be detected in the detection space DR and the reference character 8 designates a photodiode as an optical receiver for receiving the light scattered on the smoke particles. Typically the LED 7 is periodically triggered, for example every 30 seconds, and in each case only for a brief duration, for example for 100 ms. DS designates the detection signal, output by the optical receiver 8, which is passed for further signal processing to an electronic evaluation unit 3 shown in the central part of FIG. 1. The designation "μC" here symbolizes a microcontroller as a preferred embodiment of the evaluation unit 3. The latter is connected to the detection unit 2 via corresponding connection lines for supplying electrical power and for receiving the detection signal DS. The detection signal DS can be e.g. an analog voltage signal which correlates with the intensity of the light scattered on the smoke particles in the detection space DR.

The reference character 4 designates an energy storage device, typically a battery for supplying electrical power to the fire detector 1 and its electronic or electrical components. The battery 4 can be e.g. an E block with a rated voltage of 9V. The battery voltage $U_{Bat}$ present there is detected metrologically by the evaluation unit 3, for example by an A/D converter as a voltage measuring unit, and compared with a digital value which corresponds to a first voltage threshold $U_{Low}$, for example a voltage figure of 7.5 volts when using a 9V battery. Alternatively the battery voltage $U_{Bat}$ present can be passed to a comparator or operational amplifier which then compares it with a reference voltage for a first voltage threshold $U_{Low}$.

Furthermore the electronic evaluation unit 3 has warning means for outputting an acoustic warning AW if the battery voltage $U_{Bat}$ falls below the first voltage threshold $U_{Low}$. For the output an electroacoustic converter is provided as an acoustic warning device 5 in the present example, and is triggered via an electrical alternating voltage signal as a first trigger signal AS1. Typically the acoustic warning AW as well as an acoustic alarm message AA are output via the same acoustic warning device 5 when a fire is detected. Additionally an optical warning device 6, for example an LED, is triggered for optical alarm signaling OA and for optical warning OW via a second output trigger signal AS2.

According to the invention the fire detector 1 has a sensor that is sensitive to ambient light which at the same time is the optical receiver 8, in other words the photodiode 8, of the scattered-light detection unit 2. At the same time the fire detector 1 comprises means (not further shown) for suppressing the output of the acoustic warning AW if the ambient light falls below a predefinable brightness threshold HG. In the simplest case the microcontroller 3 evaluates the detection signal DS already detected by means of the A/D converter to see whether or not the brightness threshold HG has been undershot. The latter can be stored as a digital value in the microcontroller 3. In the example in the present FIG. 1 the detection signal DS is averaged by means of a low-pass filter 10 implemented in software with a filter frequency of e.g. 0.1 s, before it is then compared to the brightness threshold HG. If darkness is detected, the acoustic warning AW to replace the battery 4 is not output. Alternatively the low-pass filter can be implemented using analog circuit technology.

Figure 2:
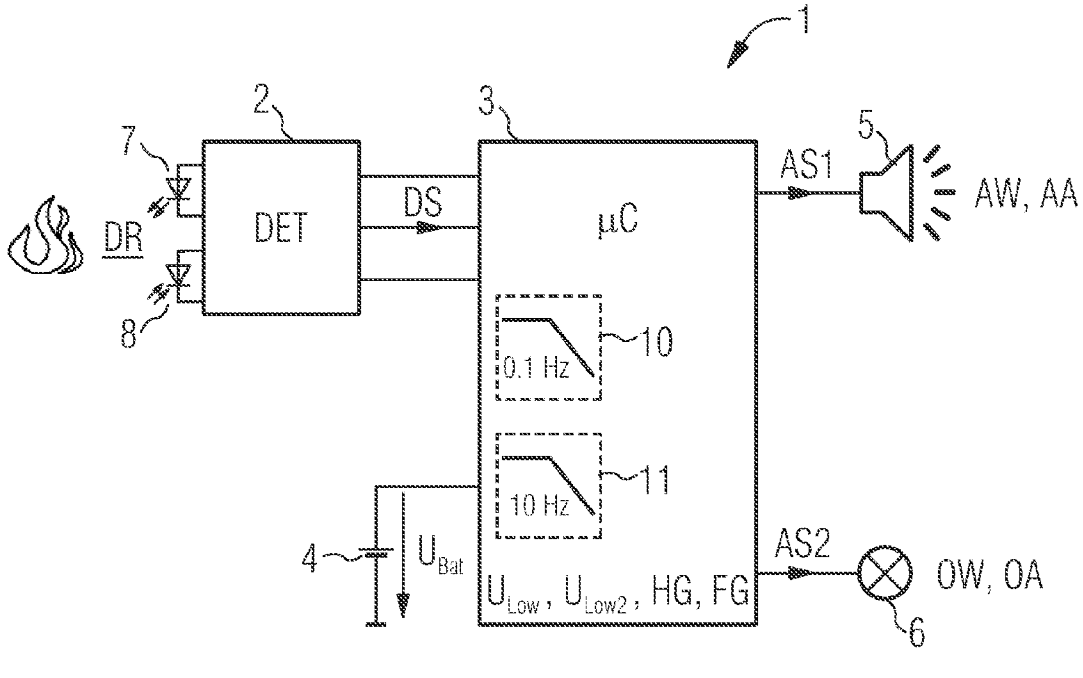
FIG. 2 is a block diagram of an advantageous modification.

FIG. 2 shows an advantageous embodiment of the inventive fire detector 1. Compared to the previous FIG. 1 the fire detector 1 still has means for detecting fluctuations in a detection signal DS output by the optical receiver 8 of the scattered-light detection unit 2. The means can have a low-pass filter 11 with a filter frequency of 10 Hz, for example. Higher-frequency signal elements above 10 Hz are in contrast suppressed as potential interference signals in the detection signal DS. Furthermore the means for suppressing the output of the acoustic warning AW are set up such that the warning is suppressed if no or no significant fluctuations can be detected. This is preferably done by comparing this filtered detection signal DS with a predefinable fluctuation threshold FG. By appropriately setting the two thresholds HG, FG, for example by means of a potentiometer, it is possible that at night the output of the warning to replace the battery is suppressed despite any fluctuations present. Both thresholds HG, FG can also be stored as corresponding digital values in the evaluation unit 3. $U_{Low2}$ designates a second voltage threshold. If the battery voltage $U_{Bat}$ also falls below this voltage figure $U_{Low2}$, the output of the warning AW, OW is not suppressed.

The invention claimed is:

1. A fire detector, comprising:

an open scattered light detection unit operational on an optical scattered-light principle within a detection space outside of a fire detector housing, said detection unit including an optical receiver sensitive to scattered light within said detection space;

an electronic evaluation unit connected to said detection unit and a warning device for outputting an acoustic and/or optical alarm when a fire is detected;

an energy storage device for an autarkic supply of electrical power to the fire detector;

a voltage measuring unit for measuring a battery voltage present at said energy storage device and a warning device for outputting an acoustic warning if the battery voltage falls below a given voltage threshold;

said optical receiver of said open scattered light detection unit also forming an ambient light sensor sensitive to ambient light; and a device for suppressing the output of the acoustic warning if a signal received from said ambient light sensor indicates that the ambient light lies below a predefined brightness threshold.

2. The fire detector according to claim 1, wherein said warning device is configured to output the acoustic warning and to output the acoustic alarm.

3. The fire detector according to claim 1, wherein said warning device is configured to output an optical warning and to output the optical alarm.

4. The fire detector according to claim 1, which further comprises a sensor for determining whether or not persons are present in or absent from a vicinity of the fire detector and wherein said device for suppressing is configured to suppress the output of the warning if an absence of people is detected.

5. The fire detector according to claim 1, which comprises a device for detecting fluctuations in a detection signal output by said optical receiver of said scattered-light detection unit and wherein said device for suppressing the output of the warning is additionally set up to suppress the warning if no fluctuations can be detected.

6. The fire detector according to claim 1, wherein said warning device is configured to cancel the suppression of the output of the warning if the battery voltage detected by said voltage measuring unit falls below a second voltage threshold that is lower than the given voltage threshold.

7. The fire detector according to claim 1, wherein the warning is output in the form of periodic short warning pulses.

8. The fire detector according to claim 1, wherein at least part of said voltage measuring unit, said warning device, and/or said suppression device are implemented by said evaluation unit.

9. The fire detector according to claim 8, wherein said electronic evaluation unit is a processor-aided processing unit.

10. The fire detector according to claim 9, wherein said evaluation unit is a microcontroller.

* * * * *